US006283744B1

(12) United States Patent
Edmondson et al.

(10) Patent No.: US 6,283,744 B1
(45) Date of Patent: Sep. 4, 2001

(54) HYBRID SOAP STAMPING BARS

(75) Inventors: Brian Edmondson; Alan William Espie, both of Bebington (GB); Edward Ross Story, Trumbull, CT (US)

(73) Assignee: Unilever Home & Personal Care USA, Division of Conopco, Greenwich, CT (US)

( * ) Notice: Subject to any disclaimer, the term of this patent is extended or adjusted under 35 U.S.C. 154(b) by 0 days.

(21) Appl. No.: 09/321,011

(22) Filed: May 27, 1999

(30) Foreign Application Priority Data

May 29, 1998 (GB) .................................................. 9811634

(51) Int. Cl.[7] ............................ C11D 13/18; B29C 33/56

(52) U.S. Cl. .......................... 425/403; 249/115; 264/338; 425/470; 427/133; 427/256

(58) Field of Search ..................................... 425/394, 395, 425/403, 406, 470; 249/114.1, 115; 264/337, 338; 427/256, 299, 133

(56) References Cited

U.S. PATENT DOCUMENTS

| | | | | |
|---|---|---|---|---|
| 3,761,047 | * | 9/1973 | Mao | 249/115 |
| 4,822,273 | * | 4/1989 | Adams et al. | 425/394 |
| 5,362,226 | * | 11/1994 | Kataoka et al. | 249/115 |
| 5,543,159 | * | 8/1996 | Iltgen | 249/114.1 |
| 5,653,932 | * | 8/1997 | Aida et al. | 249/114.1 |

FOREIGN PATENT DOCUMENTS

| | | |
|---|---|---|
| 4124198 | 1/1993 | (DE) . |
| 0276971 | 8/1988 | (EP) . |
| 0285722 | 10/1988 | (EP) . |
| 0766730 | 4/1997 | (EP) . |
| 2738522 | 3/1997 | (FR) . |
| 843300 | 3/1958 | (GB) . |
| 2276345 | 9/1994 | (GB) . |
| 56/038213 | 4/1981 | (JP) . |
| 63/188014 | 8/1988 | (JP) . |
| 96/00278 | 1/1996 | (WO) . |
| 98/11194 | 3/1998 | (WO) . |
| 98/29236 | 7/1998 | (WO) . |

OTHER PUBLICATIONS

International Search Report Application No. PCT/EP 99/03733 mailed Oct. 12, 1999.

* cited by examiner

*Primary Examiner*—James P. Mackey
(74) *Attorney, Agent, or Firm*—Ronald A. Koatz

(57) ABSTRACT

A stamping die includes a substrate stamping surface comprising a base matrix of open structure having a coating of elastomeric material applied thereon. The resulting surface is a composite comprising predominantly elastomer having matrix protruding through the elastomer in places.

16 Claims, 1 Drawing Sheet

HYBRID SOAP STAMPING BARS

The invention relates to stamping dies, and particularly soap stamping dies. By soap in this context is meant a solid product containing soap, synthetic detergent, or a combination thereof which comprises at least 20% of the product.

Soap stamping dies generally consist of a pair of symmetrically opposed die halves, each having a cavity, which are brought together about the substrate to form a stamped billet of substrate. A critical part of the stamping process involves the release of the stamped billet from a die half after separation of the halves. Various methods of facilitating die release have been proposed, including the use of die ejectors, coating the substrate stamping surfaces with talcum powder or a release fluid, or coating the stamping surfaces with an elastomeric coating.

For example, EP 285 722 discloses a composite coating for imparting an abrasion resistant release surface to a substrate, the coating comprising a thermal sprayed metal matrix having a film of silicone impregnated thereon.

The method of coating dies with elastomeric coatings has proven to be a particularly successful means of facilitating die release; however, various problems have been encountered with this method. Firstly, elastomers, when used in stamping machines, are continually exposed to shear strain and deformation, due to the stamping action of the dies. This leads to the elastomeric coatings becoming damaged over relatively short periods of time. When this happens, which in the case of continuously operating stampers can be as often as every three weeks, the coatings on the dies needs to be replaced, which involves shutting down the machines for prolonged periods of time.

A further problem with such coatings is that during application, some elastomers may sag and run down non-horizontal faces of the die before curing, which results in an uneven surface which is non-uniform in thickness. Such faults on the stamping surface of the die generally translate into faults on the stamped product.

A further problem with some elastomers is that they require a bonding agent to achieve suitable adhesion with the die surface, which bonding agents generally comprise reactive chemicals, having high hazard classification and volatile organic compounds as carrier solvents. Modern health, safety and environmental legislation imposes increasingly strict controls on the industrial use of these materials.

It is a desirable object of the invention to provide a substrate stamping surface for stamping dies which overcomes or improves on at least some of the above problems.

In a first aspect of the invention, there is provided a stamping die having a substrate stamping surface which comprises a base matrix of open structure having a coating of elastomeric material applied thereon. In this specification, the term "open structure", when applied to the matrix, is taken to mean that the surface of the matrix is non-uniform and if viewed, in cross section, would include a multiplicity of depressions, peaks and plateaus. Typically the peak to depression distance might be in the region of 50–200 microns, or 70–150 microns. When applied to such a matrix surface, the elastomer fills the depressions and coats into the matrix in such a way that it becomes strongly bonded to the matrix, by virtue of the interlocking nature of the bonding. Further, low viscosity elastomer compositions, when applied to such open matrix structures, are retained by the matrix until they cure, and thus the elastomers are less likely to drain or sag.

In a preferred embodiment of the invention, the stamping surface is a composite structure with the matrix protruding through the elastomeric coating in places. Ideally, the surface is predominantly elastomer.

Generally, the matrix comprises a ceramic or metal material which, in one embodiment, is applied to the die by means of plasma or flame spraying techniques. Alternatively, the matrix may be formed by means of laser or mechanical micro-machining, chemical etching, anodisation, spark erosion, plasma or ion beam treatment of the material of the die. However, the invention is not restricted to the above methods of forming an open structure matrix.

A full description of the term "elastomer" and specific examples of suitable elastomers can be found in the Applicants published European Patent Application No. 95924225, the content of which is incorporated herein by reference. In a preferred aspect of the invention, the elastomer comprises a silicone or a fluorosilicone elastomer.

Suitable elastomers for use in dies according to the invention typically have a relatively low level of damping, and a low modulus. According to a further aspect preferred elastomers may typically contain carbon, and hence be the "R", "M" or "U" classes, as classified by the American Society for Testing and Materials D1418. These classes are the unsaturated carbon chain elastomers, saturated carbon chain elastomers, and elastomers containing carbon, nitrogen and oxygen in the polymer chain. Elastomers of this type have been found to be relatively easy to refurbish on dies, for example by burning off entirely the residue of the old elastomer coating.

Suitable carbon containing elastomers include polyurethane, acrylonitrile butadiene rubber, and hydrogenated acrylonitrile butadiene rubber, especially hydrogenated acrylonitrile butadiene rubber. Examples of the latter include Therban (ex. Bayer) and Zetpol (ex. Zeon).

The invention also relates to a process for making a stamping die, the process comprising the steps of:

preparing an open structure matrix surface on the die surface; and applying a coating of elastomer onto the matrix.

Ideally the process includes the subsequent step of curing the elastomer.

Typically, the matrix forming step includes the matrix forming methods referred to above.

The invention also relates to the use of composite hybrid coatings of the type comprising an open structure base matrix having an elastomeric coating applied thereon as substrate stamping surfaces in stamping dies.

Ideally, the resultant hybrid coating includes pockets of matrix protruding through the elastomeric coating.

The invention also relates to a process for stamping a product, such as for example a detergent bar, by employing a stamping die having a stamping surface comprising a base matrix of open structure having a coating of elastomeric material applied thereon, the process comprising the steps of:

feeding a product composition to the stamping die;

stamping the composition in the die to form a stamped product; and releasing the stamped product from the die.

Ideally, the product being stamped will be a detergent composition such as for example soap. However the process and device of the invention is similarly envisaged for use in the stamping of various diverse products such as, for example, tablets and foods.

Coatings and substrate stamping surfaces prepared according to the invention give excellent metal-elastomer interfacial bond strength. In many cases, the bond strength obviates the need for the use of separate bonding agents. Hence in a further aspect of the invention there is provided an elastomer coated die which is absent a bonding agent or primer between the metal die and the elastomer layer. Furthermore, the matrix of the invention provides a support surface with multiple points of contact for the elastomer applicator, such that the elastomer may be pushed deep into the matrix, wetting the texture and resulting in excellent mechanical interlocking and elastomer-base adhesion. The coating is of uniform and optimum thickness, controlled by the maximum peak height of the matrix texture.

With coatings of the invention, the functional elastomer coating is protected from accidental damage by the pockets of hard matrix which protrude through the elastomer coating in embodiments where this is the case. Thus, improved resistance to physical damage can be achieved even when relatively soft and fragile elastomers are used. The shear strain that occurs in the elastomer at key places on the die surface is minimised, since zones of elastomer are restrained by islands of matrix and are prevented from contributing to bulk elastomer shear deformations and to wear processes. These factors contribute to providing more robust factory equipment, and a significant increase in lifetime of the hybrid die.

Careful control of the matrix roughness allows the imparting of a composite final surface topography to the hybrid coated die. This can assist in reducing friction at the product elastomer surface and reduce the incidence of unsightly surface marks on the soap bar. Further, a preferred surface texture may be applied to the soap bar by control of the texture of the hybrid coated die.

The invention will be more clearly understood from the following description of some embodiments thereof, given by way of example only.

1. EMBODIMENT OF THE HYBRID DIES INCLUDING A MEANS OF MANUFACTURING

The hybrid die consists of the following components, a metal soap die; a hard, wear resistant open matrix; and an elastomer top coating. Examples of hybrid die fabrication are as follows.

(a) A metal soap die is machined from aluminum then a commercially available hybrid coating is applied, e.g. PlasmaCoat 1915/11, from Impreglon UK Ltd, comprising a tungsten carbide base layer and a silicone elastomer (b) Apply a hard, wear resistant open matrix of nickel/aluminum powder onto the shaped surface of the die, by thermal spraying techniques. An elastomer of choice is then coated on the matrix as follows. An elastomer [e.g. Dow Corning silicone Silastic 9050/50], prepared as recommended by the manufacturer is then coated onto the shaped surface of the die with a clean, soft paintbrush, to a coating thickness where the texture of the nickel/aluminum is just fully coated over. The die coated with elastomer is placed in an oven at 160° C. for 2 hours to cure the elastomer.

2. DESCRIPTION OF THE USE OF HYBRID DIES WITH SOAP

This section demonstrates that the advantageous reduction in adhesion between stamped products and stamping surfaces that is achieved using elastomeric coatings (as demonstrated in European Patent Application No. 95924225) is inherent in using the hybrid coatings of the current invention.

Laboratory measurements have been carried out using aluminum punches on which the end face has been coated by flame spraying Ni/Al powder, in a range of narrow particle size distributions between 38 and 280 $\mu$m. Then a silicone elastomer was applied by spraying from a solvent solution. Before curing the elastomer, additional layers were applied [1, 2 and 3] to give a range of final coating thickness [not quantified]. The final surface roughness of this hybrid coating was from 1–15 $\mu$m Ra and was found to be dependent on both metal particle size and elastomer coating thickness.

Each punch was indented into a soap formulation which had been preheated to 40° C. The depth of indentation was 3 mm and during indentation the punch was rotated at 12 rpm. The punch was then pulled away from the soap and the force required to separate the punch and soap was measured. The adhesive forces developed were in the range 10–45 N for all coated punches, or 10–25 N if the punches coated with a single layer of elastomer were excluded. All the elastomer coated punches showed markedly reduced adhesive force compared with an uncoated polished stainless steel control punch [100 N].

3. DEMONSTRATION OF ADVANTAGES OF HYBRID DIES OVER CONVENTIONAL ELASTOMER COATED DIES

3.1 Metal-Elastomer Bonding Without Chemical Primer

Experiments have shown that the mechanical keying of elastomer into the hybrid base coating can give excellent metal-elastomer interfacial bond strength or fracture energy, to such an extent that it is no longer necessary to use a chemical bonding agent or primer, as is required with conventional metal-elastomer bonding. Hence the use of and exposure to the hazardous chemicals often contained in reactive primers can be avoided. Chemical primers have been essential for achieving sufficient adhesion between several soap die materials, e.g. silicone elastomer and brass, and in the worst case there is effectively zero interfacial bond strength without their use.

However, as in many other rubber-metal bonding applications, a significant additional increase in interfacial adhesion can be obtained by the use of chemical bonding agents. They may be found beneficial for particular base-elastomer hybrid combinations, in terms of interfacial adhesion or long term durability and stabilization of the interface against corrosion. In this case the hybrid texture gives a greatly increased and convoluted interface, that must be mechanically disrupted or chemically attacked before any interfacial failure.

These features, (a) sufficient interfacial strength without primer and (b) enhancement of the hybrid base with primer, have been exemplified using two silicone elastomers of different cohesive strength and a 180° peel test [BS 3712, part 4, 1991]. This test consists of a laminate, where a fine stainless steel wire mesh is embedded in the elastomer and peeled off a rigid metal substrate. A fracture energy (G) is calculated from the peel strength [P, the peel force per unit width (w)], using the equation $G=2P/w$.

The substrates were (i) brass that had been blasted with glass beads, (ii) brass as before, then primed with S2260 [this is a reference for conventional elastomer coated metal dies; no primer results in almost zero fracture energy and no useful bond strength], (iii) aluminum that had been flame sprayed with Ni/Al powder and (iv) aluminum that had been flame sprayed with Ni/Al powder then primed with S2260. Primer and elastomers were supplied and used as recommended by Dow Corning.

| Elastomer | Average Fracture Energy [KJ/m²] and Failure Mode [Cohesive of Interfacial] Silastic 9050/50 | Silastic 9280/50 |
|---|---|---|
| glass bead blasted brass no primer | ~0.6/ Int | ~0.8/Int |
| glass bead blasted brass and S2260 primer | 2.3/ Coh | 4.0/Int |
| Hybrid Base (flame sprayed Ni/Al powder on Aluminum) | 2.3/ Coh | 3.5/Int |
| Hybride Base (flame sprayed Ni/Al powder on aluminum and S2260 primer) | 2.2/ Coh | 4.6/Int |

With the weaker elastomer [9050/50], discounting substrate (i), the other three substrates resulted in cohesive failure of the elastomer, i.e. the interfacial fracture energy exceeded the fracture energy of the elastomer [2.3 KJ/$m^2$]. (a) Therefore the interfacial bond strength provided by the hybrid base is adequate, even without primer. (b) Since failure remains cohesive, no additional information is obtained when primer is added to the hybrid base. With the stronger elastomer [9280/50], all substrates resulted in interfacial failure between base and elastomer, i.e. the strength of the interface was less than the internal strength of the elastomer. It may be concluded form this that (a) the interfacial bond strength provided by the hybrid base alone [3.5 KJ/$m^2$], was similar to the bead blasted brass with primer [4.0 KJ/$m^2$], and (b) if primer is used with the hybrid base, the fracture energy was enhanced [4.6 KJ/$m^2$].

3.2 Ease Of Elastomer Application 3.2.1 Retention of a Low Viscosity Elastomer by a Textured Hybrid Surface Low viscosity elastomer coatings can be coated by brush, dip or spray onto the matrix, and the elastomer is retained by the matrix texture until cure. They are less likely to drain from non-horizontal surfaces and this results in a more uniform thickness of elastomer. This avoids coating sag or draining in dies with thin elastomer coatings, as may under certain conditions happen with coatings described described in the Applicants published European Patent Application No. 9592 4225.6.

An example of this effect was shown when metal surfaces, either as-received brass or aluminum coated with flame sprayed Ni/Al, were coated with a low viscosity elastomer [Silastic 9050/50] then held at an angle of 90° (vertical), for both a holding time of 15 minutes at room temperature, then the recommended cure of 2 hours at 160/C. A thin coating was applied, approximately 100 $\mu$m, as is done for thin coated dies, a full description of which is given in EP 95924225.6. No control was applied to reproduce the same coating thickness between panels.

Coating thickness was measured at a series of locations from the top of each panel using laser profilometry across the boundary formed by a film of gold which had been vapour deposited to a thickness of a few nanometers onto one half of the elastomer surface. The laser reflects from the gold but passes through the transparent elastomer and reflects back off the base. Thus a step occurs at the edge of the gold film which enables the thickness to be calculated.

Figure 1:
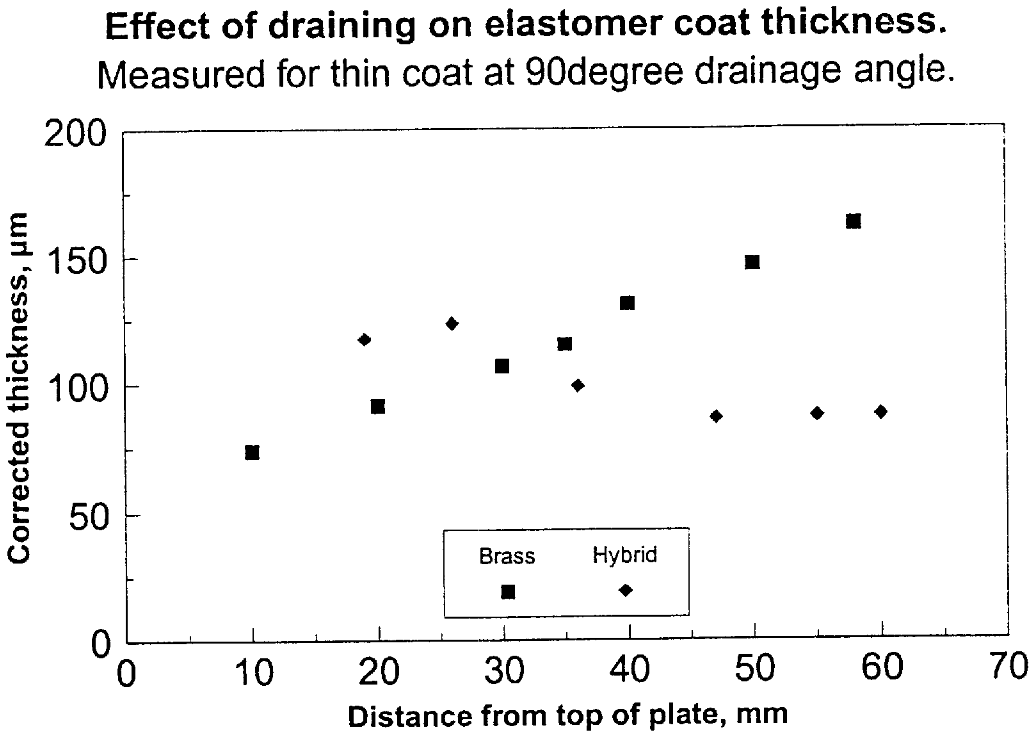
FIG. 1 shows the results obtained for the brass and hybrid coated plates.

This example and the data demonstrates the draining that occurs with a thin coated brass plate when held vertically for 15 mind. at room temperature after coating and for a further 2 hours during curing at elevated temperature. In comparison, the data for the hybrid plate showed no evidence of draining but gave a thickness of coating of 100+/−20 microns.

Therefore for thin coats, the hybrid surface reduces slumping of low viscosity elastomer coatings on angled surfaces.

3.2.2 Coating of a Textured Hybrid Surface with a High-Viscosity Elastomer

Elastomers with high viscosity or paste-like consistency before curing are difficult to apply directly as a thin, even, flaw-free coating. They can be applied from organic solvent, but this involves the use of hazardous organic solvents and potential degradation in final mechanical properties of the elastomer. Spreading with an applicator directly onto the metal die results in an uneven coating thickness. However the matrix of a hybrid base can provide a support surface with multiple points of contact for the applicator, such that the paste can be pushed deep into the matrix. With care and skill, an effective even surface for contact with soap can be made. The coating is of uniform and optimum thickness, controlled by the maximum peak height of the matrix texture. The texture of the hybrid base layer is fully wetted by the uncured elastomer and this results in excellent mechanical interlocking and elastomer-base adhesion.

To exemplify this benefit, interfacial fracture energies were obtained with the 180° peel test described above and with the elastomer Silastic 9280/50 on the hybrid base Ni/Al. A thin layer of elastomer, sufficient for die coating, was applied using a soft plastic applicator as described above, then a peel test laminate was built up with more uncured elastomer and cured at 160° C. for 2 hours. The fracture energy from this assembly was 3.6 KJ/$m^2$ and the failure mode was interfacial. In comparison, when the initial layer of elastomer was applied from a dilute solution in an organic solvent, such as toluene, this gave a very similar interfacial fracture energy of 3.5 KJ/$m^2$. Therefore the direct application method results in equally high interfacial bond strength, but avoids the hazards or problems of solvent application.

3.3 Improved Lifetime

The functional elastomer coating is protected from accidental damage by the hard protruding matrix. Improved resistance to physical damage can be achieved even when relatively soft and fragile elastomers are used. The shear strain that occurs in the elastomer at key places on the die surface is minimised, since zones of elastomer are restrained by islands of matrix and are prevented from contributing to bulk elastomer shear deformations and to wear processes. These factors contribute to more robust factory equipment and a significant increase in lifetime of the hybrid die, as shown in the following example.

The end face of a brass punch was coated with a flame sprayed layer of tungsten carbide. This was then coated with an elastomer [Dow Corning silicone Silastic 9050/50] to make the hybrid coating. A similar brass punch was primed with Dow Corning primer S2260 and coated with the same elastomer.

The punches were mounted in turn onto a machine designed to accelerate wear caused by the rubbing on soap. This test has been found in practice to mimic die life in factory situations. The punch is driven repeatedly into a test soap which is being slowly extruded through an opening. The pressures exerted on the punch are designed to match those that would occur during stamping. The test continues until the soap starts to adhere to the punch surface and the number of indentation cycles taken for this to occur is recorded. The punch is then cleaned with ethanol and replaced on the machine. The process is repeated until the soap again adheres to the punch surface. These are referred to as the first and second stick values. Sticking is caused by micro damage to the surface of the elastomer and is indicative of the onset of wear.

The elastomer coated punch stuck after first 70,000 then second 72,000 cycles, whereas the hybrid coated punch continued operating until first 100,000 then second 110,000 cycles. The hybrid coating of this invention resulted in a lifetime improvement of approximately 40%.

3.4 Topography, Friction And Texture

By careful control of the matrix roughness it is possible to impart a composite final surface topography to the hybrid coated die. This can assist in reducing friction at the soap elastomer surface and reduce the incidence of unsightly surface marks on the soap bar. In addition a preferred surface texture can be applied to the soap bar by control of the texture of the hybrid coated die.

3.4.1 Friction

Flat sheets of aluminum were coated in a similar manner, with flame sprayed metal and elastomer, to the punches described earlier in section 2. The frictional force developed in sliding a piece of soap across the surface of the sheets was measured at a range of sliding velocities [7–30 mm/s] and applied normal loads. Friction coefficients were calculated from the slopes of the frictional force/normal force plots. Values were also obtained using a 3 mm thick layer of silicone, which can be considered as bulk elastomer. The thick elastomer had a very high coefficient of friction with the soap [1.9–2.4], caused by bulk deformation of the elastomer. By constraining the elastomer in the matrix the friction is considerably reduced [0.4–0.8].

3.4.2 Texture

The roughness of the hybrid coated punches and the soap surfaces, after the adhesion experiment described in section 2, were measured using a non-contacting laser profilometer. There is a strong and direct correlation [~1:1] between the roughness of the punch and the resulting soap surface roughness, both measured in Ra ($\mu$m).

The invention is not limited to the embodiments hereinbefore described which may be varied in both construction and detail.

What is claimed is:

1. A stamping die having a substrate stamping surface comprising a base matrix of open structure having a coating of elastomeric material applied thereon wherein the stamping surface comprises a comprises a composite surface which is predominantly elastomer having the matrix protruding through the elastomer.

2. A stamping die as claimed in claim 1, wherein the surface of the matrix which viewed in cross section includes a multiplicity of depressions, peaks and plateaus.

3. A stamping die according to claim 1, wherein the matrix has multiple points of contact for the elastomer.

4. A stamping die as claimed in claim 1, wherein matrix protrudes through the elastomer in islands.

5. A stamping die as claimed in claim 1, wherein the die is absent a bonding agent or primer adhering the elastomer to the matrix.

6. A stamping die as claimed in claim 1, wherein the matrix comprises a ceramic or metal material.

7. A stamping die as claimed in claim 6 wherein the matrix is applied by means of plasma or flame-spraying.

8. A stamping die as claimed in claim 1, wherein the matrix is formed by means of laser or mechanical micro machining, chemical etching, anodisation, spark erosion, plasma or ion beam treatment of the material of the die.

9. A stamping die as claimed in claim 1 wherein the elastomer comprises a silicone or fluorosilicone elastomer.

10. A stamping die as claimed in claim 1, wherein the elastomer comprises a carbon containing elastomer.

11. A stamping die according to claim 10, wherein the elastomer is selected from unsaturated carbon chain elastomers, saturated carbon chain elastomers, and elastomers containing carbon, nitrogen and oxygen in the carbon chain.

12. A stamping die according to claim 11, wherein the elastomer is polyurethane, acrylonitrile butadiene rubber, or hydrogenated acrylonitrile butadiene rubber.

13. A process for making a stamping die comprising the steps of:

preparing an open structure matrix surface on a die surface; and applying a coating of elastomer onto the matrix such that a stamping surface of the stamping die is formed, the stamping surface comprising a composite surface which is predominantly elastomer having the matrix protruding through the elastomer.

14. A process for stamping a detergent bar comprising bringing together about a soap substrate a pair of symmetrically opposed die halves containing a die as described in claim 1 to form a stamped billet of substrate.

15. A process for stamping a product by employing a stamping die according to claim 1 having a stamping surface comprising a base matrix of open structure having a coating of elastomeric material applied thereon, the process comprising the steps of:

feeding a product composition to the stamping die;

stamping the composition in the die to form a stamped product; and releasing the stamped product from the die.

16. A process according to claim 15, wherein the product is a soap bar.

* * * * *